United States Patent Office 3,515,710
Patented June 2, 1970

3,515,710
BERYLLIUM CONTAINING POLYMERIC
COMPOSITION
Gaetano F. D'Alelio, South Bend, Ind., assignor, by direct
and mesne assignments, to Dal Mon Research Co.,
Cleveland, Ohio, a corporation of Delaware
No Drawing. Continuation-in-part of applications Ser. No.
751,567, July 28, 1958, Ser. No. 761,484, Sept. 17, 1958,
and Ser. No. 762,227, Sept. 22, 1958. This application
Sept. 27, 1961, Ser. No. 141,013
Int. Cl. C08f 7/02, 7/04
U.S. Cl. 260—93.5
20 Claims This invention relates to polymers containing beryllium. This application is a continuation-in-part of applicant's copending applications Ser. Nos. 751,567, filed July 28, 1958, now abandoned; 761,484, filed Sept. 17, 1858, now abandoned; and 762,227, filed Sept. 22, 1958, now abandoned.

Because of the high energy content of such compounds, beryllium compounds having beryllium to carbon bonds, such as beryllium alkyls, should be useful as fuel compositions. However, because of their tendency to ignite spontaneously upon exposure to air, and the highly reactive nature of these compounds, the use of beryllium alkyls involves considerable danger and necessitates various precautionary steps. Moreover, since they are liquids, their use as propellant fuels for rockets, missiles, and related devices, has the drawback common to liquid fuels in that complicated containers and pumping devices are required, and the sloshing effect of the liquids in their containers causes shifting of weight which adversely affects directional control.

In accordance with the present invention, polymeric beryllium compounds have been discovered which have more easily controlled flammability and reactivity while still retaining high energy content. Such polymeric materials can be made in a solid state and thereby have the inherent advantages of solid fuels used for propelling purposes.

The polymeric compositions of this invention are prepared from beryllium hydrides, and hydrocarbon-substituted beryllium hydrides, by reaction with hydrocarbon compounds (including those having substituents thereon which are nonreactive to the beryllium hydrides and substituted hydrides), having a plurality of ethylenically unsaturated groups therein, or at least one acetylenic group therein, including polymers containing such groups.

Such compositions can be made in liquid or solid form, and can be converted to infusible forms. These polymeric compositions are useful as high energy fuels, either as a supplement or as a main component, and are particularly useful in the solid form for such purposes. Particularly useful infusible solid fuels can also be made by incorporating a solid or liquid oxidizing agent into the polymeric compositions of this invention while they are in a liquid or thermoplastic state, and then converting the polymer to a crosslinked, infusible condition.

Typical examples of the hydrides and hydrocarbon substituted hydrides of beryllium which can be used in the practice of this invention include, but are not limited to, the following: beryllium hydride, beryllium alkyl hydrides, such as methyl beryllium hydride, ethyl beryllium hydride, propyl beryllium hydride, butyl beryllium hydride, octyl beryllium hydride, nonyl beryllium hydride, styryl beryllium hydride, cyclohexyl beryllium hydride, phenyl beryllium hydride, dimethyl beryllium, diethyl beryllium, methyl ethyl beryllium, dipropyl beryllium, dibutyl beryllium, ethyl butyl beryllium, diamyl beryllium, dioctyl beryllium, distyryl beryllium, methyl phenyl beryllium, dicyclohexyl beryllium, ethyl cyclohexyl beryllium, dicyclopentyl beryllium, etc. These beryllium compounds, sometimes generally referred to hereinafter as beryllium hydride compounds, can be used as such or in various complex forms, such as complexes with ethers, tertiary amines, thioethers, etc.

It has been found, in accordance with this invention, that polyalkenyl or acetylenic compounds, such as butadiene, acetylene, etc., and the beryllium hydride compounds can be made to react in such a manner as to produce polymers having beryllium in the polymer chain, and in relatively high proportions. The lower limit on the proportions of polyalkenyl or acetylenic compound will vary according to its functionality. For example, the polymeric products can contain as little as 0.67 mole of dialkenyl or acetylenic compound per atom of beryllium, and as little as 0.33 mole of trialkenyl compound per atom of beryllium. While even more olefin can be used, depending on how low a percentage of beryllium is desired in the polymer, it is generally desirable to have no more than about 1,.5 moles of polyalkenyl or acetylenic compound per atom of beryllium in the polymer. The range is advantageously between about 1 and 1.5 moles of polyalkenyl or acetylenic compound per atom of beryllium. On the basis of metal equivalents, the general range is translated to mean from less than about 0.5 mole to about 0.8 mole of unsaturated compound per equivalent of beryllium. However, when other metals are substituted in part for the beryllium, as indicated hereinafter, these proportions are modified accordingly.

The polymeric products of this invention range from viscous oils to solid thermoplastic or thermoset resins. Depending upon the particular starting materials, modifiers, and polymerization conditions, the polymers range in molecular weight from about 300 to 100,000 and higher.

The polymeric products of this invention are represented by the formula

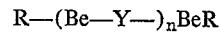

wherein R is hydrogen or a hydrocarbon radical, n is an integer having a value of at least 2, preferably at least 4, and Y is a polyvalent radical derived from the acetylenic and ethylenic compounds and having as many valencies as there are beryllium atoms attached thereto. When derived from a dialkenyl compound or from a monoacetylenic compound having no ethylenic groups therein, Y is a divalent radical. When derived from a monoacetylenic compound, which also has one ethylenic group therein, or from compounds having a plurality of acetylenic groups therein, or from compounds having more than two ethylenic groups therein, Y can have more than two valencies. When derived from a polymer having a considerable number of ethylenic or acetylenic groups therein, Y also has more than two valencies. The R hydrocarbon radical preferably has no more than 24 carbon atoms. A hydrocarbon nucleus of R can have attached thereto substituents which are non-reactive toward the metal compound used in the preparation of the polymer. Also additional unreacted ethylenic and acetylenic groups may also be present.

Polymers of this invention have a plurality of repeating units therein, which can be represented by the formula —Be—Y— in which Y is a polyvalent hydrocarbon radical. Some of these polyvalent hydrocarbon radicals can be derived from a hydrocarbon compound having a plurality of ethylenic groups therein and having the formula

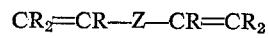

wherein R represents hydrogen or a hydrocarbon group, and Z represents a single bond between the two carbon atoms adjacent to Z, or a polyvalent hydrocarbon group. The hydrocarbon nucleus of R and of Z can have attached thereto substituents which are nonreactive toward the beryllium hydride compound used in the preparation of the polymer. However, acetylenic or additional ethylenic groups can also be attached to R and Z.

Certain polyvalent hydrocarbon radicals as represented by Y can also be derived from hydrocarbons having acetylenic or allenic unsaturation therein.

While it is believed that each beryllium atom becomes attached to one of the carbon atoms of an ethylenic or acetylenic group, it is also possible that the beryllium migrates during or after the reaction between the beryllium hydride compound and the polyalkenyl or acetylenic compound, and becomes attached to another carbon atom of the resultant compound that gives a more stable derivative. Thus, the beryllium may actually be attached to one of the R groups, or to Z. For that reason, Y groups derived from polyalkenyl compounds can be represented as a polyvalent radical having the formula $$C_2R_3H-Z-C_2R_3H$$

in which the specific carbon atoms to which the beryllium is attached are not specified.

In polymers derived from polyalkenyl hydrocarbon compounds, Y can be replaced by the above formula in which the actual poits of attachment of the berylium are not pinpointed, as follows:

$$R-[Be-(C_2R_3H-Z-C_2R_3H-]_nBeR$$

When the beryllium becomes attached and does not migrate from the ethylenic group, the polymeric product from polyalkenyl compounds can be represented by the following formula:

$$R-\left[-Be-\left(\begin{array}{c}H-/\\R_2C-C-CR\\ \backslash\end{array}\right)-Z-\left(CR-CR_2\right)-H\right]_nBeR$$

or generally can be simplified, particularly where the ethylenic groups are vinyl or vinylidene groups, to:

$$R-(-Be-CR_2-CHR-Z-CHR-CR_2-)_n-BeR$$

Likewise, when the acetylenic compound is represented as $RC\equiv CR$, wherein R is hydrogen or a hydrocarbon group, the metal can actually be attached to one of the carbon atoms of the acetylenic group, or to the R group. For that reason, Y can be represented as a polyvalent radical having the formula $R_2C_2H_2$ without pinpointing the carbon atom to which the metal is attached.

In accordance with the above discussions, typical Y groups derived from acetylenic or allenic compounds include, but are not restricted to, the following:

$$-CH_2CH_2-;\ -CH_2CH_2CH_2$$

$$-CH_2CH_2CH-;\ -CHCH_2-;$$
$$\quad\quad\quad\quad\ \ |\quad\quad\quad\ \ |$$
$$\quad\quad\quad\quad\ CH_3\quad\quad CH_3$$

$$\quad\ \ |\quad\quad\ \ |$$
$$(CH_3)_2CCH_2C(CH_3)_2;\ -CHCH_2-;\ -CH-CH-$$
$$\quad\quad\quad\quad\quad\quad\quad\ \ |\quad\quad\quad |\quad\ \ |$$
$$\quad\quad\quad\quad\quad\quad\quad C_2H_5\quad\ CH_3\ CH_3$$

$$-CHCH_2-;\ -CHCH_2-;\ -CHCH_2-;\ -CHCH_2-;\ -CHCH_2-$$
$$\ |\quad\quad\quad\ \ |\quad\quad\quad\ \ |\quad\quad\quad\ \ |\quad\quad\quad\ \ |$$
$$C_6H_5\quad\ C_6H_{11}\quad\ C_4H_7\quad\ C_{10}H_7\quad\ C_6H_4CH_3$$

$$-CH_2CH-CH_2CH_2-;\ -CH_2CHC_6H_4CHCH_2-;$$
$$\quad\ \ |\quad\quad\quad\quad\quad\quad\quad\quad\ \ |\quad\quad\quad\ \ |$$

$$-CH_2CHC_6H_4CH_2CH_2-;\ -CH_2CHC_6H_{10}CHCH_2-$$
$$\quad\ \ |\quad\quad\quad\quad\quad\quad\quad\quad\ \ |\quad\quad\quad\quad\ \ |$$

$$-CH_2CHC_6H_{10}CH_2CH_2-;\ -CH_2CHCH_2C_6H_4CH_2CHCH_2-$$
$$\quad\ \ |\quad\quad\quad\quad\quad\quad\quad\quad\ \ |\quad\quad\quad\quad\quad\quad\quad\ \ |$$

$$-CH_2CH_2-;\ -CH_2CH_2CH_2-$$

etc.

Accordingly, the polymeric products of this invention derived from acetylenic compounds can be represented by the formula:

$$R(-BeC_2H_2R_2)_n-BeR$$

When the beryllium becomes atached and does not migrate from the acetylenic group, the polymeric product is represented by the following formula:

$$R(-BeRHC-CHR)_nBeR$$

In the above formula the various symbols are as previously defined and additional acetylenic or ethylenic groups can also be attached to one or more R's.

Likewise, the polymeric products derived from allenic compounds are believed to be represented by the corresponding formulas:

$$R(-BeC_3H_2R_4)_n-BeR$$

and $$R(-BeCR_2CH_2CR_2)_n-BeR$$

respectively.

When the beryllium hydride compound has no more than one hydrocarbon group attached to each beryllium atom, such as beryllium hydride, ethyl beryllium hydride, methyl beryllium hydride, propyl beryllium hydride, styryl beryllium hydride, etc., and an acetylenic or allenic compound is used, it is believed that polymerization proceeds linearly, at least initially, as follows:

$$RBeH+RC\equiv CR\rightarrow H-(BeC_2H_2R_2-)_nBeR$$

or $$RBeH+R_2C=C=CR_2\rightarrow H-(BeC_2H_2R_4-)_nBeR$$

When a beryllium compound is used which has two hydrocarbon groups on each beryllium atom, the hydrocarbon groups can be displaced by the acetylenic or allenic compounds and the R groups liberated as the corresponding olefin. For example, when the two R's on each beryllium atom are hydrocarbon groups, the polymer is believed to proceed linearly, at least initially, as follows:

$$BeR_2+RC\equiv CR\rightarrow R-(BeC_2H_2R_2-)_nBeR+nR\ \text{olefin}$$

or $$BeR_2+R_2C=C=CR_2\rightarrow R-(BeC_2H_2R_4)_nBeR+nR\ \text{olefin}$$

In accordance with the preceding, the polymers of this invention have a plurality of repeating units therein of the formula $-Be-Y-$. In these repeating units, Y is a polyvalent hydrocarbon radical as defined above. Specific Y radicals which fit this description appear in the following repeating formulas which represent the products and various examples described hereinafter. For example, in Example I, the polymers have a repeating unit structure of $-Be-C_2H_4C_6H_4C_2H_4-$.

In Example IV, the product has a repeating unit structure of $-Be-C_6H_{12}-$.

The product of Example V has a repeating unit structure of $-Be-C_4H_7(CH_3)-$.

In Example VI, the polymer resulting from reaction of diallyl benzene has a repeating unit structure of $$-Be-C_3H_6C_6H_4C_3H_6-$$

and the polymer resulting from reaction of divinyl naphthalene has a repeating unit structure of $$-Be-C_2H_4C_{10}H_6C_2H_4-$$

In Example VI, the polymer resulting from the reaction of divinyl diphenyl has a repeating unit structure of $-Be-C_2H_4C_6H_4C_6H_4C_2H_4-$.

In Example VII, the polymer resulting from the reaction of divinyl cyclohexane has a repeating unit structure of $-Be-C_2H_4C_6H_{10}C_2H_4-$.

In Example Ia, IIIa and IVa, the resultant polymers have repeating unit structures of $-Be-C_2H_4-$;

$$-Be-C_3H_6-;\ -Be-C_2H_3-$$
$$\quad\quad\quad\quad\quad\quad\quad\quad\ \ |$$
$$\quad\quad\quad\quad\quad\quad\quad\quad C_6H_4$$

respectively.

Infusible polymers can be obtained in the practice of this invention by using a hydrocarbon compound having three or more ethylenic groups therein, or at least one acetylenic and one ethylenic group or a plurality of acetylenic groups therein, or by using, together with the beryllium hydride compound, a trivalent metal compound, such as the boron and aluminum hydrides and their hydrocarbon-substituted hydrides. When the above-indicated types of unsaturated compounds are used, the crosslinking is effected through another Y group, which can also be represented by the various formulas indicated above for Y. When a trivalent metal compound is used, such as a boron or aluminum hydride, together with the beryllium hydride compound, the crosslinkage can also be represented as a Y group which will be connected between polymer molecules through the trivalent metal atoms.

For example, when crosslinking is effected through a copolymerized trivalent metal atom such as aluminum, it is believed that the crosslinked portions of the polymer can be represented as

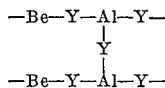

Y can also be represented as $C_2R_3H\text{---}Z\text{---}C_2R_3H$, $C_2H_2R_2$ or $C_3H_2R_4$.

In the polymerization described herein, when conditions permit, the hydrocarbon group which is replaced by the polyalkenyl or acetylenic compound, generally escapes from the system as an olefin. In cases of closed systems, the buildup of pressure, or the reluctance of a radical such as phenyl toward olefin formation, can result in the attachment of the hydrocarbon group to the carbon atom of the ethylenic or acetylenic group, other than the one to which the beryllium is attached.

Various modifications of polymeric materials can be made according to the practice of this invention by adjusting the proportions of reactants and the conditions under which the materials are made to react. For example, the amount of crosslinking is controlled by the amount of compound having three or more ethylenic groups, etc., therein that is added, or the amount of trivalent metal compound that is added for that purpose. The selectivity, type of reaction, and product, can be controlled somewhat by selecting appropriate beryllium compounds, concentration thereof, polyalkenyl or acetylenic compound, and also by the use of certain amounts of monoalkenyl compounds. For example, since the hydrogen in these beryllium compounds is generally more easily replaced than alkyl compounds, it is possible thereby to control somewhat the type and extent of reaction.

When it is desired to control the molecular weight of a linear polymer, or to put terminal carbon groups on a polymer chain, this can be accomplished by using a mono-olefin, such as ethylene, together with the polyalkenyl (or acetylenic) compound. The latter can also be effected by using a mono- or di-substituted beryllium, alone or together with unsubstituted beryllium hydride.

Some control over the type and extent of reaction can be effected by using beryllium hydride compounds having hydrocarbon groups of different sizes. It is sometimes desirable, also, that the hydrocarbon groups to be replaced by the polyalkenyl or acetylenic compound be of a smaller size than the polyalkenyl or acetylenic compound. This is particularly desirable where there is a displaced hydrocarbon group escaping as a byproduct olefin. In some cases, a polyalkenyl or acetylenic compound of higher boiling point than the resultant olefin permits escape of the olefin upon refluxing of the polyalkenyl or acetylenic compound, or upon maintaining the reaction temperature below that at which the polyalkenyl or acetylenic compound vaporizes to an undesirable extent. In some cases, particularly where the difference in volatility is not great, the olefin can be permitted to escape in a stream of the polyalkenyl or acetylenic compound passing through the system, or in a stream of inert gas with additional polyalkenyl or acetylenic compound being fed to the system. In cases where the polyalkenyl or acetylenic compound has a higher vapor pressure than any olefin that might be given off as byproduct, a closed system can advantageously be used to favor the desired displacement.

The temperature conditions for the promotion of polymer formation, in accordance with the practice of this invention, vary in accordance with the reactivity of the reagents being used. When a beryllium hydride is being reacted with a polyalkenyl or acetylenic compound, a temperature in the range of 70°–80° C. is generally suitable. When beryllium hydride compounds containing both hydrogen and hydrocarbon groups are used, the reaction can be controlled mainly to displace the hydrogen by keeping the temperature below 100° C. When hydrocarbon groups are to be displaced from a beryllium hydride compound, a temperature of about 100–120° C. is preferred. Depending upon the decomposition temperatures of the particular reagent, and the polymeric product, it is generally advantageous not to exceed a temperature of about 140° C. When a mixture of a beryllium hydride and a beryllium hydride compound containing hydrocarbon groups is being used, it is generally desirable to maintain the appropriate temperature until most of the hydrogen has been displaced and then to raise the temperature to that more suitable for displacement of the hydrocarbon group. In some cases the temperature control can be facilitated by the use of an inert solvent, such as heptane, octane, benzene, toluene, xylene, etc., whose boiling point is close to the desired temperature.

The time required for polymer formation varies in accordance with the reactivity of the ethylenic or acetylenic groups in the polyalkenyl or acetylenic compound, the type of group to be displaced in the beryllium hydride compound, the temperature being used, and various other factors which favor the reaction, such as the use of metal catalysts, such as nickel, cobalt, etc., the removal of the byproduct olefin, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with vinyl groups in the polyalkenyl or acetylenic compound. Vinylidene groups also react rapidly when the second group attached to the doubly substituted carbon is relatively small. With larger groups in that position, longer reaction times and increased temperatures, but still below decomposition temperature, are desirable. Terminal acetylenic groups are more reactive than internal acetylenic groups, and ethylenic groups having hydrocarbon groups attached to both the alpha and the beta carbon atoms are still less reactive than the vinylidene groups, and require longer reaction time even at the more favorable temperature conditions. The time will also vary in accordance with the degree of polymerization required. While the more active reagents can give polymers in even less time, many of the polymeric products of this invention can be produced at moderate temperatures in a matter of 12 to 48 hours. In some cases, such as, with the non-reactive type of ethylenic groups, or when low temperatures, for example as low as 50° C., are used, much longer reaction periods are desirable. In such cases, the reaction is continued until a solid product is obtained.

Polyalkenyl compounds than can be used in the practice of this invention include those having the formula $R_2C\!=\!CR\text{---}Z\text{---}CR\!=\!CR_2$ wherein R and Z are as defined above. Typical polyalkenyl compounds that can be used in the practice of this invention, include, but are not limited to, the following: 1,3-butadiene, isoprene, 2,3-dimethyl butadiene, pentadiene-1,3-hexadiene-2,4, octadiene-2,4, hexatriene-1,3,5, 2-phenyl-butadiene, 1,4-pentadiene, hexadiene-1,5, 2,4-dimethyl-pentadiene-1,4, vinyl cyclohexene, 1-phenyl-pentadiene-1,3, divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, diallyl cyclohexane, diallyl cyclopentane, dibutenyl cyclohexane, dipentenyl cyclohexane, allyl cyclohexene, diallyl cyclohexene, divinyl cyclohexane, 1,7-diphenyl-heptadiene-1,6, 2,7-diphenyl-octadiene-1,7, etc.

Polyalkenyl aryl compounds which can be used in the practice of this invention include: divinyl benzene, trivinyl benzene, divinyl naphthalene, trivinyl naphthalene, divinyl diphenyl, trivinyl diphenyl, divinyl toluene, trivinyl toluene, divinyl xylene, divinyl ethyl benzene, divinyl chlorobenzene, divinyl methylnaphthalene, divinyl ethylnaphthalene, divinyl methyldiphenyl, divinyl ethylidiphenyl, vinyl isopropenyl benzene, vinyl isopropenyl naphthalene, vinyl isopropenyl diphenyl, vinyl isopropenyl toluene, vinyl isobutenyl benzene, vinyl isobutenyl naphthalene, vinyl isobutenyl diphenyl, vinyl allyl benzene, vinyl allyl napthalene, vinyl allyl diphenyl, vinyl allyl toluene, vinyl allyl methylnaphthalene, diallyl benzene, triallyl benzene, diallyl naphthalene, triallyl naphthalene, diallyl diphenyl, triallyl diphenyl, diallyl toluene, diallyl xylene, diisopropenyl benzene, diisopropenyl naphthalene, diisopropenyl diphenyl, diisopropenyl toluene, diisopropenyl methyl naphthalene, dimethallyl benzene, dimethallyl naphthalene, dimethallyl diphenyl, bis-(alpha-ethyl-ethenyl)-benzene, bis - (alpha - ethyl-ethenyl)-benzene, bis-(alpha-ethyl-ethenyl)-naphthalene, bis-(alpha-ethyl-ethenyl) - diphenyl, bis - (alpha - vinyl-ethyl)-benzene, bis-(alpha-vinyl-ethyl)-naphthalene, bis-(alpha-vinyl-ethyl)-diphenyl, vinyl(alpha-vinyl - ethyl)-benzene, vinyl(alpha-vinyl-ethyl) - naphthalene, vinyl-(alpha-vinyl-ethyl)-diphenyl, etc.

Other polyalkenyl aryl compounds than can be used include: Dipropenyl benzene, p-propenyl styrene, para-propenyl isopropenyl-benzene, dicrotyl benzene, dicrotyl naphthalene, dicrotyl diphenyl, dicrotyl xylene, bis-(4-vinyl-n-butyl)-benzene, bis-(5-isopropenyl - n - hexyl)-benzene, bis-(5-methyl-nonene-6-yl)-diphenyl, bis - (n-decen-5-yl)-toluene, di-cyclopentenyl-naphthalene, di-cyclohexenyl-benzene, etc.

Typical acetylenic and allenic compounds that can be used in the practice of this invention include, but are not limited to the following: acetylene, methylacetylene, ethyl acetylene, propyl acetylene, amyl acetylene, vinyl acetylene, diacetylene(butediyne), dipropargyl(hexadiyne-1,5), hexadiyne-2,4, allene, butadiene-1,2, 4-methyl-pentadiene-1,2, tetramethyl allene, phenyl acetylene, phenylene diacetylene, para-vinyl phenyl acetylene, naphthyl acetylene, cyclohexyl acetylene, cyclopentyl acetylene, naphthylene diacetylene, cyclohexylene diacetylene, dipropargyl benzene, dipropargyl naphthalene, dipropargyl cyclohexane, p-propargyl styrene, etc.

Compositions of this invention are also prepared from polymeric hydrocarbon materials containing a plurality of unsaturated groups therein, such as ethylenic and acetylenic groups, by reaction with the metal compounds. The polymeric materials used in the preparation of these compositions have a molecular weight of at least about 500, advantageously above 1,000, and have an average of at least four unsaturated groups per polymer molecule, advantageously more than ten such groups per polymer molecule.

The polymeric starting materials include polymers of polyunsaturated hydrocarbon monomers in which substantially only one of the unsaturated groups have been reacted in forming the polymer, and a substantial amount of the other unsaturated group or groups remains unreacted.

In polymers having a plurality of repeating units therein in which there is an unsaturated hydrocarbon group, e.g. an ethylenic or acetylenic group, the unsaturated repeating unit of the starting polymer can be represented as —Y″— and the resultant repeating unit after the metal hydride addition as

wherein X represents R or another Y′ group.

The reaction can be represented at least initially as follows:

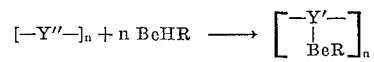

For example, when a 1,2-butadiene polymer is reacted with BeR$_2$ or BeHR to replace only one R group or only the hydrogen in the hydride, the reaction can be represented initially at least as:

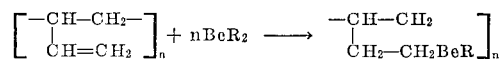

When the R group is also replaced the resultant repeating unit structure can be represented by

Thus when the 1,2-butadiene polymer shown above is further reacted to displace the second R group of the BeR$_2$, the polymer will have a plurality of repeating units of the formula

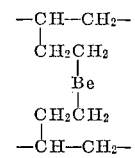

In such polymeric products the portion of the polymers consisting of the hydrocarbon portion having a plurality of the Y′ repeating units can be represented as Y, with —BeR or —BeY groups attached thereto. Thus, these polymeric products also fit the generic formula R—[Be—Y—]$_n$BeR as described above. Typical examples of polyunsaturated hydrocarbon monomers that can be used in the preparation of these polymeric starting materials are the polyunsaturated compounds listed above for use as such in the practice of this invention.

Polymers having pendant groups, such as vinyl or vinylidene groups or terminal acetylenic groups therein, such as in 1,2-polybutadiene types of polymers, are preferred in the practice of this invention, since they react more easily with the metal compounds, but it is also possible to use polymers having ethylenic groups other than vinyl and vinylidene groups, and acetylenic groups other than terminal ones. In such cases, the reaction with the metal compound can be completed satisfactorily by the application of higher temperatures, or longer reaction periods than are generally required with the vinyl, vinylidene, or terminal acetylenic groups. Methods of polymer preparation which favor the production of pendant types of unsaturated groups and methods of determining relative percentages of such groups are well known in the art. Typical unsaturated polymeric material include uncured polymers and copolymers of butadiene, isoprene, divinyl benzene, 2,3-dimethyl butadiene, uncured natural rubber, ethylene-acetylene copolymers, etc., as listed above for the formula R$_2$C=CR—Z—CR=CR$_2$.

Polymers having pendant vinyl, vinylidene, or terminal acetylenic groups, particularly useful in the practice of this invention, are those having repeating units, such as the following typical types:

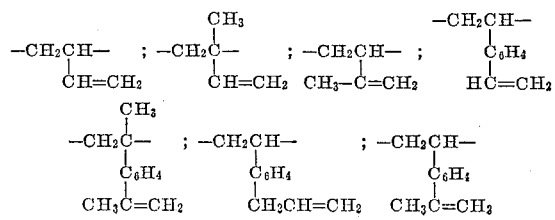

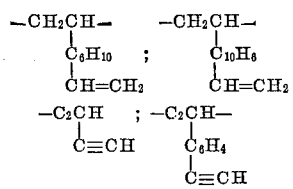

etc.

Typical polymeric starting materials having ethylenic or acetylenic groups not of the terminal type include those having repeating units of the following types:

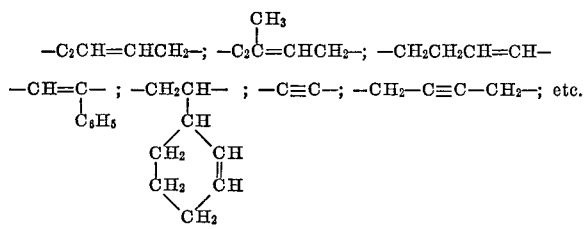

It is generally desirable to use proportions of the reactants in accordance with the properties desired in the polymer products. For example, if low molecular weight products are desired, molar proportions of the acetylenic or ethylenic compound in excess of the theoretical proportions favor this. Where high proportions of the metal are desired, this is favored by use of excess metal compound, and also by the use of compounds having a greater number of unsaturated groups therein. High proportions of metal in the product are also favored by the use of low molecular weight acetylenic and ethylenic compounds.

The addition reactions of this invention are promoted by organic ethers, such as for example, diethyl ether, diisopropyl ether, tetrahydrofurane, diglyme, vinyl ethyl ether, vinyl butyl ether, vinyl propyl ether, vinyl amyl ether, vinyl cyclohexyl ether, vinyl phenyl ether, vinyl tolyl ether, isopropenyl ethyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, paravinyl anisole, allyl benzyl ether, vinyl benzyl ether, vinyl phenethyl ether, isopropenyl phenethyl ether, etc., as well as corresponding dialkenyl ethers, such as divinyl ether, diallyl ether, etc. Such unsaturated ethers as indicated above can be added directly to the reaction mixture to serve as modifiers as well as catalysts. They can also be reacted with the metal compounds and then added.

Typical mono-alkenyl modifiers that can be used in the practice of this nivention include, but are not limited to, the following: ethylene, propylene, butene-1, butene-2, hexene-1, hexene-2, p-butyl-ethylene, 2,4,4-trimethyl-1-pentene, 2,4,4-trimethyl-pentene-2, cyclopentene, cyclohexene, styrene, 1,1-diphenyl ethylene, vinyl cyclohexane, alphamethyl-styrene, vinyl naphthalene, betamethyl styrene, allyl benzene, allyl cyclohexane, decene-1, decene-2, decene-3, decene-4, decene-5, dodecene-1, dodecene-2, tetradecene-1, hexadecene-1, cycloheptene, etc.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric." Molecular weights given herein are Staudinger molecular weights.

EXAMPLE I

A mixture of 67 parts of diethyl beryllium dissolved in 100 parts of hexane is added to 130 parts of divinyl benzene, and is heated in an atmosphere of nitrogen to boil off the hexane. After the hexane is thus removed, the temperature is raised and maintained at 100° C. Ethylene is gradually evolved from the reaction mixture. After heating for 72 hours, the reaction mixture is cooled and a solid product is obtained. This is ground with an equal weight of ammonium perchlorate. The resultant mixture burns vigorously when ignited and when tested for propellant thrust shows excellent thrust properties.

EXAMPLE II

The procedure of Example I is repeated except that in place of the divinyl benzene, a mixture of 104 parts of divinyl benzene and 30 parts of trivinyl benzene is used. In this case, an infusible product is obtained, which, after grinding with an equal weight of ammonium perchlorate, shows vigorous burning properties when ignited, and excellent thrust properties.

EXAMPLE III

The procedure of Example I is repeated, using in place of the diethyl beryllium a mixture of 44 parts diethyl beryllium and 38 parts of triethyl aluminum. An infusible product is obtained which, when ground with an equal weight of ammonium perchlorate, burns vigorously upon ignition and shows excellent thrust properties.

EXAMPLE IV

The procedure of Example I is repeated, using in place of the divinyl benzene an equivalent weight of diallyl, omitting the hexane, and sealing the mixture under vacuum in a glass tube. The resultant solid product shows similar burning and thrust properties as for the product of Example I.

EXAMPLE V

The procedure of Example IV is repeated with similar results, using 39 parts of ethyl beryllium hydride and 68 parts of isoprene.

EXAMPLE VI

The following procedure is followed a number of times, using in each case a different mixture as indicated in Table I below. The number appearing before a particular compound in this table and in subsequent tables, indicates the number of parts by weight of that compound used. In each case the mixture is maintained under an atmosphere of nitrogen, and the temperature is raised gradually over a period of several hours and then maintained at 120°–130° C. for a period of about 72 hours. In each case the resultant solid product is processed as in Example I and upon testing exhibits excellent burning and thrust properties.

TABLE I

| | |
|---|---|
| 64 Dipropyl beryllium. | 230 Divinyl toluene. |
| 46 Tripropyl boron. | 1 Ethyl ether. |
| 82 Diphenyl beryllium. | 280 Divinyl diphenyl. |
| 120 Triphenyl aluminum. | |
| 220 Distyryl beryllium. | 100 Octadiene-1,7. |
| | 10 Octatriene-1,3,7. |
| 260 Dicyclohexyl beryllium. | 120 Diisopropenyl benzene. |
| | 50 Triisopropenyl benzene. |
| 160 Dibutyl beryllium. | 120 Diallyl benzene. |
| | 50 Triallyl benzene. |
| 250 Di-(3-phenyl-propyl)beryllium. | 135 Divinyl naphthalene. |
| | 50 1,2,3-triallyloxy propane. |

EXAMPLE VII

The following procedure is repeated a number of times, using in each case a different mixture as indicated in Table II below. In each case the mixture is heated under a nitrogen atmosphere, and in accordance with the corresponding increase in reflux temperature, the temperature is gradually increased to 75°–90° C. and maintained in that range for approximately five hours. Then the temperature is gradually raised to 120°–130° C. for approximately 72 hours. The products are processed as in Example I, and each product exhibits excellent burning and thrust properties.

TABLE II

| | |
|---|---|
| 115 Styryl beryllium hydride. | 65 Divinyl benzene. |
| | 52 Trivinyl benzene. |
| 39 Ethyl beryllium hydride. | 100 Divinyl naphthalene. |
| 53 Propyl beryllium hydride. | 130 Divinyl cyclohexane. |
| | 15 Trivinyl benzene. |
| 87 Phenyl beryllium hydride. | 160 Diallyl cyclohexane. |
| | 20 Triallyloxy propane. |
| 93 Cyclohexyl beryllium hydride. | 100 Octadiene-1,7. |
| | 20 Octadiene-1,3,7. |

EXAMPLE VIII

Various mixtures indicated in Table III below are treated according to the following procedure. The mixture is heated in 150 parts of hexane, in each case, under a blanket of nitrogen under reflux for two hours. Then the hexane is slowly distilled off and in accordance with the corresponding increase in reflux temperature the temperature is gradually increased to 70°–80° C. and maintained at that temperature for approximately five hours. Then, the temperature is gradually increased to 120°–130° C. for a period of 72 hours. A solid product is obtained in each case and upon processing as in Example I, each product exhibits excellent burning and thrust properties.

TABLE III

| | |
|---|---|
| 11 Beryllium hydride. | 66 Cyclopentadiene. |
| 11 Beryllium hydride. | 100 Vinyl cyclohexene. |
| 67 Diethyl beryllium. | 100 Trivinyl benzene. |
| 11 Beryllium hydride. | 110 Octadiene-1,7. |
| 25 Propyl beryllium hydride. | 40 Octatriene-1,3,7. |
| 11 Beryllium hydride. | 100 Diallyl. |
| 5 Aluminum hydride. | |
| 11 Beryllium hydride. | 100 Divinyl benzene. |
| | 25 Tris(beta-ethoxy)ethyl)-borane. |

EXAMPLE Ia

A mixture of 12 parts of di-secondary-butyl-beryllium (1 part dioxane), and 50 parts of heptane is heated in an atmosphere of nitrogen at 50° C. Pure acetylene is bubbled into the solution at such a rate that the temperature does not rise above 55° C. When approximately 3 grams of acetylene has been absorbed, the actylene supply is shut off and the temperature is maintained for an additional two hours. Then the temperature is raised gradually to distill off the heptane, following which the temperature is taken to 120° C. for a period of 30 hours. The resultant solid product is ground with an equal weight of ammonium perchlorate. This mixture, when ignited and tested, according to known tests for propellant thrust, shows excellent thrust properties.

EXAMPLE IIa

The procedure of Example Ia is repeated, using 7 parts of diethyl beryllium in place of dibutyl beryllium, and 4.5 parts of methyl acetylene in place of the acetylene. In three different tests, 4 parts of the resultant polymer are ground individually with 6 parts of ammonium perchlorate, lithium perchlorate, and potassium perchlorate, respectively. In each case, the mixture when ignited burns very rapidly with an intense white flame, and upon testing for thrust properties shows excellent thrust.

EXAMPLE IIIa

The procedure of Example IIa is repeated, except that allene is used in place of the methyl acetylene. Similar results are obtained.

The same procedure used with an equivalent weight of propyl acetylene also gives similar results.

EXAMPLE IVa

The following procedure is repeated eight times, using in each case 12 parts of di-isobutyl beryllium and with each experiment a progressively smaller amount of phenyl acetylene, as follows: 45, 33, 22, 11, 9, 5.5, 3.3, and 2 parts, respectively. In each case, the mixture of dibutyl beryllium and phenyl acetylene is prepared at room temperature under an atmosphere of nitrogen, and then the temperature is raised gradually to 80° C. and maintained there under the nitrogen atmosphere until the reaction mixture forms a solid cake and no more butene is released from the reaction. The product is ground with an equal weight of ammonium perchlorate. This mixture when ignited and tested, according to known tests for propellant thrust, shows excellent thrust properties.

EXAMPLE Va

The procedure of Example Ia is repeated, using 10 parts of di-propyl beryllium and 4.5 parts of vinyl acetylene. An insoluble product is produced which shows excellent burning and thrust properties.

EXAMPLE VIa

To a solution of 25 parts of di-isobutyl beryllium in 100 parts of heptane, covered by a blanket of nitrogen, is added 13 parts of phenylene diacetylene. The resultant mixture is heated under an atmosphere of nitrogen and the temperature is raised gradually to remove the heptane by distillation. Then the temperature is maintained in the range of 100°–120° C. for 48 hours. The resultant solid product is washed with heptane, and then ground with an equal weight of ammonium perchlorate. The resultant mixture, when ignited and tested, shows excellent burning and thrust properties.

The above procedure is repeated, using in one case cyclohexylene diacetylene, and in another case naphthylene diacetylene in amounts equivalent to and in place of the phenylene diacetylene used in the above procedure. In each case results are obtained similar to those indicated above.

EXAMPLE VIIa

The procedure of Example VIa is repeated, using 35 parts of distyryl beryllium in place of the di-isobutyl beryllium. The resultant solid product, when ground with an equal weight of ammonium perchlorate, shows excellent ignition and thrust properties.

EXAMPLE VIIIa

The following procedure is repeated a number of times, using in each case a different mixture selected from those indicated in the table below. The number appearing in the table before a particular compound indicates the number of parts by weight of that compound used. In each case the acetylenic or allenic compound, together with any solvent or modifier, is maintained under an atmosphere of nitrogen at a temperature of 50°–55° C. In the case of vinyl acetylene, it is fed into the heptane solvent at such a rate that it is present in molecular excess to the amount of beryllium dihydride present. Any acetylenic or allenic compound lost from the system through volatilization is caught in a low temperature trap and returned to the system. A solution of 20 parts of beryllium hydride in 100 parts of ether is dropped into the reaction mixture while under a blanket of nitrogen, at such a rate that no more than a 5 degree rise in temperature occurs. When the temperature rises above 60° C., the beryllium hydride solution supply is cut off or reduced until the temperature has subsided to the desired range. During this addition period, the ether is allowed to vaporize from the reaction mass and is recovered by condensation at a point before the low temperature trap mentioned above. After all the solution has been added, the heating is continued for a period of two hours, after which the temperature is raised to the solvent reflux temperature for a period of ten hours, and where no solvent is used a temperature of approximately 80° C. is maintained for that period. Then the solvent, where present, is distilled off. The resultant product in each case, upon testing as in Example Ia, shows excellent burning and thrust properties.

TABLE

| Acetylenic or Allenic Compound | Modifier | Solvent |
|---|---|---|
| 100 Phenyl acetylene | | |
| 90 Phenyl acetylene | | 50 Heptane. |
| 20 Phenylene diacetylene | | |
| 90 Phenyl acetylene | 15 Triallyloxy propane | Do. |
| 120 Cyclohexylacetylene | 10 Triethyl borane | 100 Heptane. |
| 30 Vinyl acetylene | | 100 Cyclohexane. |
| 75 Phenylene diacetylene | | 100 Heptane. |
| 80 Hexadiene-1,2 | | 10 Tetrahydrofurane. 90 Heptane. |
| 100 Amyl acetylene | 10 Triethyl aluminum | 100 Heptane. |
| 120 p-Vinyloxy-phenyl acetylene | | 100 Cyclohexane. |

EXAMPLE IXa

A mixture of 7 parts of diethyl beryllium and 10 parts of phenyl acetylene is heated under a nitrogen atmosphere at 70° C. for 10 hours. The mixture is then cooled to room temperature and 10 parts of styrene, and 36 parts of finely ground ammonium perchlorate are added. The mixture is milled to uniformity and then press-cast in the form of a rod and heated at 60°–70° C. for 12 hours. A solid, infusible product is obtained which shows excellent thrust properties.

EXAMPLE Xa

A mixture of 33 parts of distyryl beryllium, 20 parts of amyl acetylene, and 2 parts of para-allyloxy-phenyl acetylene is heated at 70° C. in a sealed container for a period of 48 hours. The resultant solid product shows excellent burning and thrust properties.

The above procedure is repeated using 40 parts of phenylacetylene, in place of the amylacetylene, and also 80 parts of ammonium nitrate, to produce a solid propellent fuel of excellent thrust.

EXAMPLE XIa

A mixture of 11 parts of diallyl beryllium, and 7 parts of triethyl aluminum is heated under an atmosphere of methane for 15 hours at 90° C. An insoluble, infusible product is obtained. This polymer is believed to have, at least in part, repeating units of the following structure:

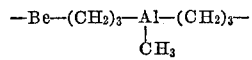

By using equivalent amounts of diethyl magnesium and triethyl borane, respectively, in place of the triallyl aluminum, and in each case repeating the preceding procedure, two solid products are obtained which are believed to have, at least in part, repeating units of the following structure:

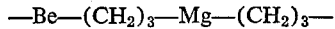

and

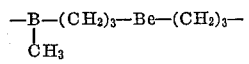

respectively.

EXAMPLE XIIa

Ten parts of the polymer of Example Ia is mixed uniformly with 40 parts of finely divided ammonium perchlorate in a solution of 9 parts of styrene, one part of a 50/50 commercial divinyl benzene-ethyl styrene mixture, and 0.1 part of benzoyl peroxide. The mixture is cast and maintained at 70° C. for 12 hours. An insoluble, infusible polymer product is obtained, which shows excellent thrust properties.

EXAMPLE XIIIa

A mixture of 10 parts of beryllium hydride, 0.1 part tetrahydrofurane, and 100 parts of heptane is prepared and maintained under an atmosphere of nitrogen at −10° C. Pure acetylene is bubbled into the solution at such a rate that the temperature is raised only very slowly to no higher than 50°–55° C. Volatile reactants escaping from the system are caught in a cold trap and returned to the reaction mixture. When approximately 3 grams of acetylene has been absorbed, the acetylene supply is shut off and the temperature is maintained at 50°–55° C. for an additional 5 hours. Then, the temperature is raised gradually to distill off the heptane, following which the temperature is taken to 80° C. for a period of 15 hours. The solid polymer product, when tested as in Example Ia, shows excellent burning and thrust properties.

The above procedure is repeated a number of times, with similar results, using in place of the beryllium hydride, an equivalent weight of:

Monoethyl beryllium hydride
Monopropyl beryllium hydride
Monobutyl beryllium hydride
Monophenyl beryllium hydride
Monocyclohexyl beryllium hydride The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from a beryllium hydride compound and allene, namely:

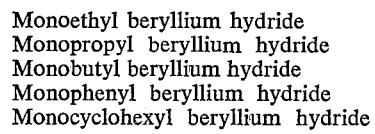

and the polymerization completed later by the application of heat or the addition of beryllium hydride compounds or other reagents, catalysts, modifiers, etc.

EXAMPLE Ib

A solution of 12 parts of di-secondary-butyl beryllium, 15 parts of solid, soluble polymer of divinyl benzene, and 0.2 part of diethyl ether in 100 parts of toluene, is heated in an atmosphere of nitrogen at 50° C. for one hour. Then the temperature is raised to 70° C. for two hours, and thereafter refluxed for five hours. The toluene is then distilled off and the reaction mixture heated at 120–130° C. for 24 hours. The solid product is washed with heptane to extract traces of unconverted dibutyl beryllium. The washed product is more stable in air than the ordinary organo-berylliums which oxidize and burn in air. The resultant product is ground with an equal weight of ammonium perchlorate. The resultant mixture, when ignited, burns very rapidly with an intense white flame, and when tested according to known tests for propellant thrust, shows excellent thrust properties.

EXAMPLE IIb

The procedure of Example Ib is repeated, using 15 parts of diethyl beryllium, in place of the dibutyl beryllium, and 0.2 part of divinyl ether. In three different tests, 2 parts of the resultant polymer are ground individually with 8 parts of ammonium perchlorate, lithium perchlorate, and potassium perchlorate, respectively. In each case, the mixture, when ignited, burns very rapidly with an intense white flame, and upon testing for thrust properties, shows excellent thrust.

EXAMPLE IIIb

The procedure of Example Ib is repeated, except that in place of the divinyl benzene polymer, there is used 6 parts of a solid, soluble polymeric butadiene, having approximately 60 percent of 1,2-polybutadiene structure. Similar results are obtained.

EXAMPLE IVb

The procedure of Example Ib is repeated, except that in place of the divinyl benzene polymer, there is used a solid, soluble, butadiene polymer having approximately 10 percent of 1,2-polybutadiene structure, and the final heating is conducted for 60 hours instead of 24. The product shows good burning and thrust properties.

EXAMPLE Vb

The following procedure is repeated eight times, using in each case 12 parts of di-isobutyl beryllium, and with each experiment a progressively smaller amount of a solid, soluble polymeric butadiene having approximately 60 percent 1,2-polybutadiene structure, as follows: 24, 18, 12, 6, 4.5, 3, 2, and 1.5 parts, respectively. In each case, the beryllium compound and the polymer are dissolved in 100 parts of benzene and heated under an atmosphere of nitrogen at 50° C. for a period of two hours, and then refluxed for a period of ten hours. Then the benzene is distilled off and the reaction mixture heated under nitrogen atmosphere at 100–130° C. for 30 hours. The product in each case is treated as in Example Ib and shows excellent burning and thrust properties.

EXAMPLE VIb

The procedure of Example Ib is repeated, using 9 parts of dipropyl beryllium, 14 parts of solid, soluble polymer of para-allyl styrene, and 0.3 part of di-(allyloxypropyl)beryllium. Similar results are obtained.

EXAMPLE VIIb

The procedure of Example VIb is repeated, using 11 parts of distyryl beryllium and 15 parts of a solid, soluble polymer of para-isopropenyl-styrene. The product shows excellent burning and thrust properties.

EXAMPLE VIIIb

The procedure of Example VIIb is repeated using 15 parts of a solid, soluble polymer of para-vinyloxy-styrene, in place of the para-isopropenyl-styrene, and omitting the di-(allyloxypropyl)beryllium. The product shows excellent burning and thrust properties.

EXAMPLE IXb

The procedure of Example VIIIb is repeated, using 16 parts of a solid, soluble polymer of para-allyloxy-styrene, in place of the vinyloxy-styrene. The product shows similar burning and thrust properties.

EXAMPLE Xb

The following procedure is repeated eight times, using in each case a different mixture of soluble polymer and modifier or catalyst, selected from those indicated in the table below. The number appearing in the table before a particular compound indicates the number of parts by weight of that compound used. In each case the polyunsaturated polymer dissolved in 100 parts of benzene, together with any catalyst or modifier, is maintained under an atmosphere of nitrogen at a temperature of 50–55° C. A solution of 11 parts of beryllium hydride and 100 parts of ether is dropped into the reaction mixture covered by a blanket of nitrogen, at such a rate that no more than a 5 percent rise in temperature occurs. When the temperature rises above 60° C. the beryllium hydride solution supply is cut off or reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of ten hours. Then, the solvent is distilled off and heating contiued at 90° C. for an additional 15 hours. The resultant product in each case shows excellent burning and thrust properties.

TABLE I

| Polyunsaturated Polymer of— | Modifier or Catalyst |
|---|---|
| 100 3-Vinyl cyclohexane | 5 Diallyl ether. |
| 60 Ethylene-acetylene copolymer (75-25 mole ratio) | 1 Divinyl ether. |
| 70 Isoprene | 5 Allyl propyl ether. |
| 70 p-Vinyl phenylacetylene | 10 Styrene. |
| 100 Diallyl ether | |
| 120 Divinyl benzene-Divinyl ether copolymer (80-20 mole ratio) | |
| 160 p-Vinyloxy-styrene | |
| 80 Uncured natural rubber | 10 Divinyl ether. |

EXAMPLE XIb

Six experiments are performed, using in each case a different solution of the beryllium compound, soluble polymer, and catalyst or modifier, dissolved in 150 parts of benzene, selected from Table IIb below, and heated under an atmosphere of nitrogen at 50° C. for one hour, then 70° C. for two hours, then refluxed for five hours, following which the benzene is distilled off and the reaction mixture heated at 100° C. for 48 hours. Excellent burning and thrust properties are exhibited by each product when tested according to Example Ib.

TABLE IIb

| Beryllium | Polymer of— | Catalyst or Modifier |
|---|---|---|
| 40 Ethyl beryllium hydride | 55 Butadiene | 5 Vinyl ethyl ether. |
| 55 Butyl beryllium hydride | 70 Butadiene-styrene copolymer (75-25 weight ratio) | 2 Tetrahydrofuran. |
| 115 Styryl beryllium hydride | 55 Ethylene-acetylene copolymer (75-25 mole ratio) | 5 Divinyl ether. |
| 70 Propyl beryllium hydride | 265 Divinyl benzene-styrene copolymer (50-50 weight ratio) | 2 Diethyl ether. |
| 100 Cyclohexyl beryllium hydride | 150-p Allyloxystyrene | 10 Styrene. |
| 90 Phenyl beryllium hydride | 50 Vinyl acetylene | 2 Diethyl ether. |

EXAMPLE XIIb

A solid, soluble polymer of divinyl benzene (130 parts) is mixed under a nitrogen atmosphere with 45 parts dipropyl beryllium on a Banbury mixer. The resultant mixture is heated under nitrogen at 80° C. for 72 hours. The resultant product, when tested according to Example I, shows excellent burning and thrust properties.

EXAMPLE XIIIb

The procedure of Example XIIb is repeated using 60 parts of dipropyl beryllium and 30 parts of styrene, in place of the 45 parts of dipropyl beryllium of Example XIIb. Similar results are obtained.

EXAMPLE XIVb

The procedure of Example XIIb is repeated with similar results, using 120 parts of dibutyl beryllium in place of the dipropyl beryllium.

EXAMPLE XVb

The procedure of Example XIIb is repeated using in place of the dipropyl beryllium, 200 parts of distyryl beryllium, and 100 parts of tributenyl aluminum. An insoluble, infusible product is obtained, which has excellent burning and thrust properties. This product has both beryllium and aluminum in the polymeric molecules.

By using equivalent amounts of dibutenyl magnesium and tributenyl boron, respectively, in place of the tributenyl aluminum, and in each case repeating the preceding procedure, two solid products are obtained having similar burning and thrust properties. These polymeric products have beryllium and magnesium in the polymeric molecules of one, and beryllium and boron in the polymeric molecules of the other product.

EXAMPLE XVIb

Ten parts of the polymer of Example Ib is mixed uniformly with 40 parts of finely divided ammonium perchlorate in a solution of 9 parts of styrene, one part of a 50–50 commercial divinyl benzene-ethyl styrene mixture, and 0.1 part of benzoyl peroxide. The mixture is cast and maintained at 70° C. for 12 hours. An insoluble, infusible polymer product is obtained, which shows excellent burning and thrust properties.

EXAMPLE XVIIb

The procedure of Example XIIb is repeated using 125 parts of dibutenyl beryllium in place of the dipropyl beryllium. The product shows excellent burning and thrust properties when tested as in Example Ib.

Typical unsaturated compounds that can be used for preparing polymers and copolymers having unsaturation therein suitable for preparing the compositions of this invention include, but are not limited to, the following:

The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from a beryllium hydride compound and butadiene, namely:

$RBeCH_2CH_2CH=CH_2$ or $Be(CH_2CH_2CH=CH_2)_2$ and the polymerization completed later by the application of heat or the addition of beryllium hydride compounds or other reagents, catalysts, modifiers, etc.

Various modifiers can be added to the compositions of this invention after the polymerization is completed, and in cases where the modifiers are non-reactive with the beryllium hydride compounds, can be added prior to the initiation of the polymerization, or at some intermediate stage. Hydrocarbon materials, such as various hydrocarbon resins, e.g. polystyrene, polyethylene, polypropylene, polybutenes, paraffins, etc., can be added at any time. Certain other resins that might influence the reaction, or be reduced or reacted upon by the beryllium hydride compound, such as those containing ester, amide, or other functional groups, can be added after the polymers are formed. However, if sufficient beryllium hydride compound is added to compensate for that used in such side reactions, such resins can often be added before or during the reaction. Typical resins include, polyethers, such as polymeric vinyl ethyl ether, polymeric vinyl butyl ether, etc., polyesters, such as polyvinyl acetate, polyvinyl propionate, polyvinyl butyrate, polymethyl methacrylate, polymethyl acrylate, etc., polyvinyl acetal, polyvinyl butyral, etc., polyacrylonitrile, polyamides, such as nylon and polymeric caprolactam, etc.

Various other polyunsaturated compounds, in addition to those indicated above, can also be added either before initiation of the polymerization, or at an intermediate stage, or at the completion of the polymerization reaction, to modify the properties of the products. Such polyunsaturated compounds include: polyunsaturated ethers, and various alkenyl derivatives of boron, magnesium, and aluminum.

Typical examples of such polyunsaturated compounds include, but are not restricted to, the following: divinyl ether, diallyl ether, vinyl allyl ether, propenyl vinyl ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, etc., triallyl borane, tetra-allyl diborane, tributenyl borane, tributenyl diborane, dibutenyl magnesium, triallyl aluminum, dibutenyl aluminum, etc.

In addition to the polyalkenyl type of boron, magnesium, and aluminum compounds indicated above, it is desirable in some cases to add monoalkenyl derivatives of such metals and to continue replacement of the remaining hydrogen or saturated hydrocarbon groups on the metal by means of the polyalkenyl compounds, or by such compounds which have already partially reacted with beryllium hydride compounds. By these techniques, both beryllium and other metals can be incorporated in polymeric materials.

For many purposes, such as fuel, it is desirable to have a high concentration of the beryllium polymeric units present in the compositions. In such cases, the modifiers are used in minor amounts. However, in certain cases, it may be desirable to use the beryllium compositions to modify or fortify the properties of other materials, in which case the beryllium derivatives are used in minor amounts.

As indicated above, the beryllium polymers of this invention are particularly useful as solid fuels. They can be used as the main fuel component, or can be added to various types of other fuels to fortify or supplement such fuels. For example, they can be used as additives to gasoline and other motor fuels, to kerosene and other materials used for turbojet engines and jet engines, and can be added to liquid and solid propellant fuels used for rockets, missiles, etc. However, these polymeric compositions are particularly useful as the main fuel component in solid propellant fuels for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and they can be stored in inert atmospheres without danger of premature ignition or explosion. The materials can simply be mixed in finely divided form, or where desired the oxidizing agent can be incorporated into a solid mass of the polymer. Moreover, after the desired amount of oxidizing agent has been incorporated into the polymeric composition, it can be converted to an infusible form by various means, including the addition of aluminum or boron hydrides and hydrocarbon-substituted hydrides, or by the addition of hydrocarbons and ether compounds having three or more ethylenic groups therein, together with the application of heat or catalysts to effect crosslinking through the trivalent metals or through the ethylenic groups, or by any other means of crosslinking.

Such fuel compositions having oxidizing agents incorporated therein are described in greater detail and covered in applicant's copending application Ser. No. 141,012, now U.S. Pat. No. 3,304,212, filed the same date herewith.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A polymer selected from the class consisting of:

$$R—[Be—(C_2R_3H—C_2R_3H)—]_nBeR$$

$$R—[Be—(C_2R_3H—Z—C_2R_3H)—]_nBeR$$

$$R(—BeC_2H_2R_2)_n—BeR$$

$$R(—BeC_3H_2R_4)_n—BeR$$

wherein $n$ is an integer having a value of at least 2, R represents a member of the class consisting of hydrogen and a hydrocarbon group, and Z represents a polyvalent hydrocarbon group.

2. A polymer of claim 1 in which the repeating units in the polymer molecules thereof have the formula $$—Be—C_2H_4C_6H_4C_2H_4$$

3. A polymer of claim 1 in which the repeating units in the polymer molecules thereof have the formula —Be—C$_6$H$_{12}$—

4. A polymer of claim 1 in which the repeating units in the polymer molecules thereof have the formula —BeC$_4$H$_7$(CH$_3$)—

5. A polymer of claim 1 in which the repeating units in the polymer molecules thereof have the formula —BeC$_3$H$_6$C$_6$H$_4$C$_3$H$_6$—

6. A polymer of claim 1 in which the repeating units in the polymer molecules thereof have the formula —Be—C$_2$H$_4$C$_{10}$H$_6$C$_2$H$_4$—

7. A polymer of claim 1 in which the repeating units in the polymer molecules thereof have the formula —Be—C$_2$H$_4$C$_6$H$_4$C$_6$H$_4$C$_2$H$_4$—

8. A polymer of claim 1 in which the repeating units in the polymer molecules thereof have the formula —Be—C$_2$H$_4$C$_6$H$_{10}$C$_2$H$_4$—

9. A polymer of claim 1 in which the repeating units in the polymer molecules thereof have the formula —Be—C$_2$H$_4$—

10. A polymer of claim 1 in which the repeating units in the polymer molecules thereof have the formula —Be—C$_3$H$_6$—

11. A process for the preparation of a polymer comprising the step of reacting at least one beryllium compound having the formula BeR$_2$ wherein R is selected from the class consisting of hydrogen and hydrocarbon radicals having no more than 24 carbon atoms therein, with at least one hydrocarbon compound selected from the class consisting of (1) monoacetylenic hydrocarbons having no other unsaturated groups therein and (2) hydrocarbon compounds having a plurality of unsaturated groups therein selected from the class consisting of ethylenic and acetylenic groups, said reaction being conducted at a temperature below the decomposition temperature of said beryllium compound until an average of at least about 4 beryllium atoms are present in each polymer molecule.

12. A process of claim 11 in which said reaction is conducted at a temperature in the range of 50–140° C.

13. A process of claim 12 in which said beryllium compound is beryllium hydride, and said reaction is conducted at least initially in the range of 50–80° C.

14. A process of claim 12, in which said beryllium compound is a beryllium dialkyl and at least part of the reaction is conducted at a temperature in the range of 100–140° C.

15. A process of claim 14 in which said beryllium dialkyl is beryllium dibutyl.

16. A process of claim 14, in which said beryllium dialkyl is beryllium diethyl.

17. A process of claim 12 in which said beryllium compound has one alkyl group per beryllium atom.

18. A process of claim 11 in which said hydrocarbon compound has a plurality of groups therein selected from the class consisting of vinyl, vinylidene and terminal acetylenic groups.

19. A process of claim 18 in which said hydrocarbon compound is divinyl benzene.

20. A process of claim 11 in which said beryllium compound is beryllium hydride and said hydrocarbon compound has a plurality of groups therein selected from the class consisting of vinyl, vinylidene and terminal acetylenic groups.

References Cited
UNITED STATES PATENTS 2,699,457    1/1955    Ziegler et al. _____ 260—683.15

LELAND A. SEBASTIAN, Primary Examiner

U.S. Cl. X.R.

149—19; 260—2, 80, 82.1, 85.1, 88.1, 88.2, 91.1, 93.1, 94.1, 94.7, 665